United States Patent [19]

Sakata

[11] Patent Number: 5,629,757
[45] Date of Patent: May 13, 1997

[54] MULTICOMPONENT LASER STRAINMETER USING FABRY-PEROT INTERFEROMETERS

[75] Inventor: Shoji Sakata, Tsukuba, Japan

[73] Assignee: Science and Technology Agency National Research Institute for Earth Science & Disaster Prevention, Ibaraki, Japan

[21] Appl. No.: 513,637

[22] Filed: Aug. 10, 1995

[30] Foreign Application Priority Data

Oct. 5, 1994 [JP] Japan ................................. 6-264398

[51] Int. Cl.$^6$ .................................................. G01B 9/02
[52] U.S. Cl. ........................... 356/35.5; 356/345; 356/352
[58] Field of Search .................................. 356/345, 352, 356/35.5; 73/800

[56] References Cited

U.S. PATENT DOCUMENTS 4,627,728  12/1986  Willson ................................. 356/345
5,353,115  10/1994  McIntyre ............................... 356/352

OTHER PUBLICATIONS

Shoji Sakata et al., Borehole-type Tiltmeter and Three--Component Stranmeter For Earthquake Prediction, J. Phys. Earth, 34, Suppl., S129-S140, 1986.

*Primary Examiner*—Frank Gonzalez
*Assistant Examiner*—Robert Kim
*Attorney, Agent, or Firm*—Armstrong, Westerman, Hattori, McLeland & Naughton

[57] ABSTRACT

A laser strainmeter has a plurality of sensor resonators, each comprising a multiple reflection interferometer having a pair of concave mirrors (8) which are secured to the inner wall of a container (1) to face each other in the diametrical direction of the container so that the optical axes of the sensor resonators extend in different directions. The laser strainmeter further has a reference resonator comprising a multiple reflection interferometer having a pair of concave mirrors (12) which are disposed in the vicinity of the sensor resonators, and which are held at a fixed distance. Laser light having the same resonance frequencies as those of the associated resonators are transmitted from laser oscillators to the resonators through optical fibers (3). A change in distance between the pair of concave mirrors of each of the sensor resonators is obtained from a difference in resonance frequency between each sensor resonator and the reference resonator, thereby obtaining a strain change of a medium in which the container is buried.

6 Claims, 3 Drawing Sheets

MULTICOMPONENT LASER STRAINMETER USING FABRY-PEROT INTERFEROMETERS

BACKGROUND OF THE INVENTION

The present invention relates to a laser strainmeter for observing small strain changes of a medium, e.g., the earth's crust, by measuring changes of diameters of a cylindrical or spherical container buried in the medium.

Precise observation of small strain changes of the earth's crust is important to studies of solid earth science or for practical purposes such as earthquake prediction or prediction of a volcanic eruption. In order to precisely measure small strain changes of the earth's crust, it is important to avoid the influence of change of temperature on the surface of the earth, or the effect of rain or an atmospheric pressure change. Accordingly, the conventional practice is to dig a borehole in the ground so deep as to reach bedrock and to install a strainmeter to the bottom of the borehole with cement or mortar.

Strainmeters of the type described above include Sakata-type borehole three-component strainmeter (Shoji SAKATA AND Haruo SATO, BOREHOLE-TYPE TILTMETER AND THREE-COMPONENT STRAINMETER FOR EARTHQUAKE PREDICTION, J. Phys. Earth, 34, Suppl., S129–S140, 1986). According to the Sakata-type borehole three-component strainmeter, deformation of a cylindrical container buried in a borehole is converted into volume changes of liquid contained in chambers of the container, and the volume changes are electrically detected. The Sakata-type borehole three-component strainmeter provides high resolution, and since it has minimal portions which involve solid friction, the apparatus is not affected by the shock of an earthquake. Accordingly, the strainmeter has the advantage of high stability. There is another borehole-type three-component strainmeter which is based on changes of bore diameters. For example, changes in diameter in three directions are enlarged by a combination of mechanical levers, and detected in the form of electric signals.

For future more effective earthquake prediction and more detailed observational studies in earth science, there is a need for a strainmeter which provides higher resolution than the conventional three-component strainmeter as described above. On the other hand, a strainmeter which is capable of operating under high-temperature conditions is demanded for prediction of volcanic eruptions. Further, there is an increasing demand for measurement in a borehole as deep as 10 km or more, which is attained by ultra-deep boring, and a strainmeter capable of enduring high temperature at that depth is demanded. Further, when it is considered to use a strainmeter as a seismometer for detecting a seismic wave, the strainmeter must function accurately in a high-frequency region.

However, the above-described conventional borehole-type three-component strainmeter suffers from the problem that, since it uses a liquid, phase change takes place at high temperature, causing the strainmeter to fail to function as desired. Further, the strainmeter cannot detect short period phenomena such as seismic waves because of the viscous resistance in the flow path. In addition, the conventional borehole-type three-component strainmeter requires a multicore cable. In view of installation in deeper boreholes or on the bottom of the sea, it is preferable to minimize the number of conductors constituting the cable for easy handling. In this case, the number of conductors of the cable is reduced by introducing a carrier device. However, it is desirable not to use a carrier device because carrier devices are generally incapable of withstanding high temperature. The existing borehole-type three-component strainmeter further involves the problem that since the overall length is long for reasons of structure, if it is combined with other observation devices to form an integrated observation system, the overall length becomes undesirably longer. The above-described mechanical borehole-type three-component strainmeter involves solid friction and backlash. Therefore, the degree of accuracy is inevitably low, and it cannot withstand a shock in particular.

SUMMARY OF THE INVENTION

In view of the above-described problems of the conventional strainmeters, an object of the present invention is to provide a laser strainmeter which has high resolution, endures high-temperature environmental conditions, and is easy to install and handle.

For this aim, the present invention provides a laser strainmeter for observing small strain changes of a medium by measuring changes of diameters of a container buried in the medium. The laser strainmeter includes a plurality of sensor resonators, each comprising a multiple reflection interferometer having a pair of concave mirrors which are attached to the inner wall of the container to face each other in the diametrical direction of the container. Optical axes of the sensor resonators extend in different directions. The laser strainmeter further includes a reference resonator comprising a multiple reflection interferometer having a pair of concave mirrors which are disposed in the vicinity of the sensor resonators, and which are held at a fixed distance from each other. Laser oscillators are connected to the sensor and reference resonators through optical fibers, respectively, so that laser lights having the same resonance frequencies as those of the associated resonators are transmitted to the resonators through the optical fibers. Thus, a change in distance between the pair of concave mirrors of each of the sensor resonators is obtained from a difference in resonance frequency between each sensor resonator and the reference resonator, thereby obtaining a strain change of the medium in which the container is buried.

The sensor and reference resonators are disposed so that the optical axes of the resonators intersect each other at different angles approximately at the center of the container. When the container is a cylindrical container, each of the sensor resonators and the reference resonator are possible to dispose in layers. Further, each laser oscillator is provided with a feedback circuit, so that the resonance frequency of each laser oscillator is made coincident with the resonance frequency of the resonator connected to the laser oscillator. The inside of the container is maintained under vacuum or filled with an inert gas.

In the laser strainmeter of the present invention, when the container disposed in a medium, e.g., the earth's crust, is deformed correspondingly to strain changes of the medium, the distance between the concave mirrors of each sensor resonator, which are attached to the inner wall of the container, changes. Thus, the resonance frequency of the sensor resonator changes. Since the distance between the concave mirrors of the reference resonator is fixed, there is no change in resonance frequency of the reference resonator. Accordingly, the two different laser lights are led to a signal processing system installed on the ground through optical fibers, and the difference in resonance frequencies which is detected by a photodetector as beat signal is read with a counter. The resonance frequency difference obtained in this way is converted into a change of diameter of the container in the optical axis direction of the sensor resonator. It should be noted that since relation between the change in strain of the earth's crust and the change of diameters of the container is obtained by calculation, it is possible to know a stain change of the earth crust by measuring the difference in resonance frequency.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF PREFERRED EMBODIMENTS

One embodiment of the present invention is described below with reference to the accompanying drawings.

Figure 1:
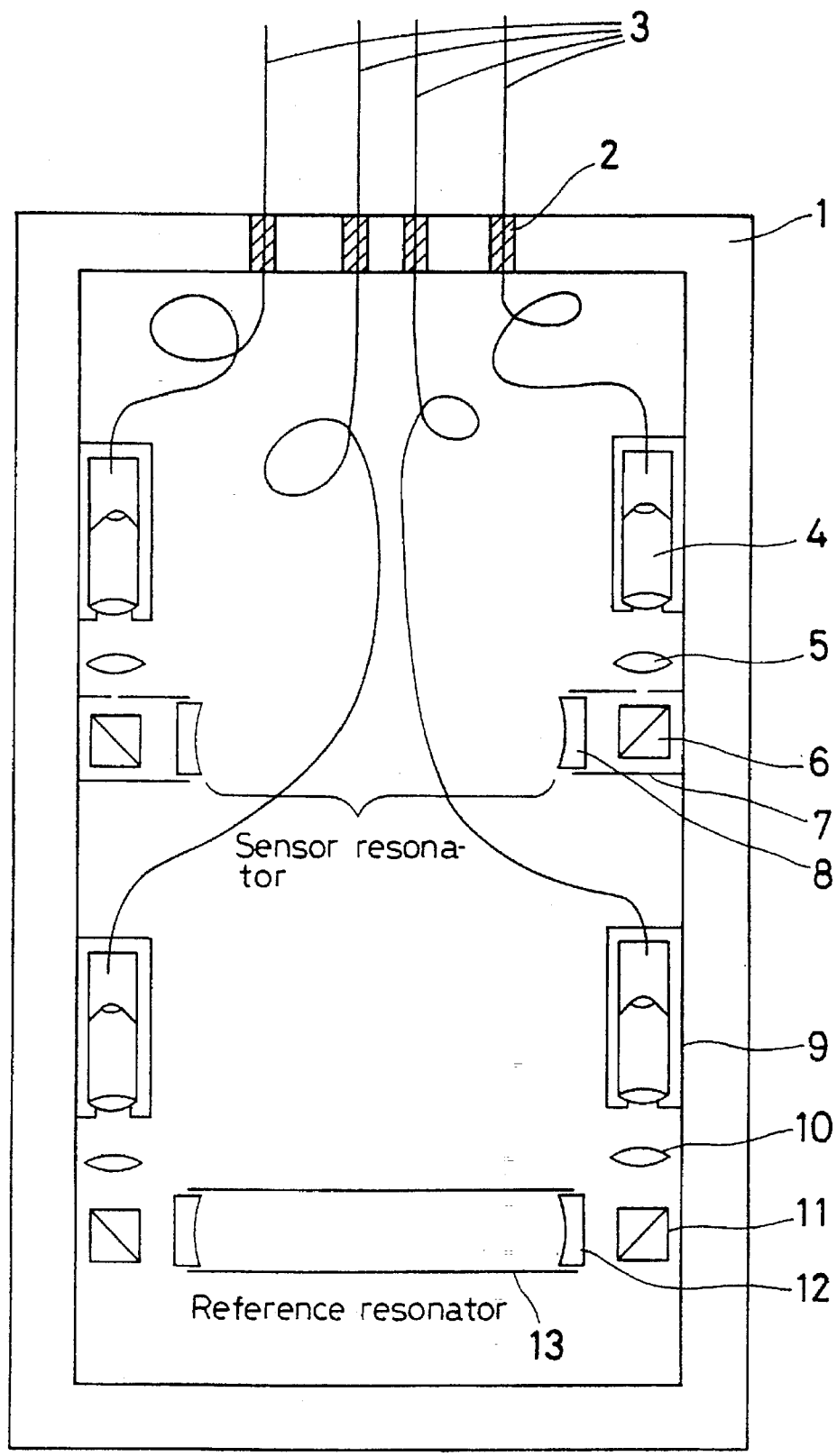
FIG. 1 shows the arrangement of one embodiment of the laser strainmeter according to the present invention.
Figure 2:
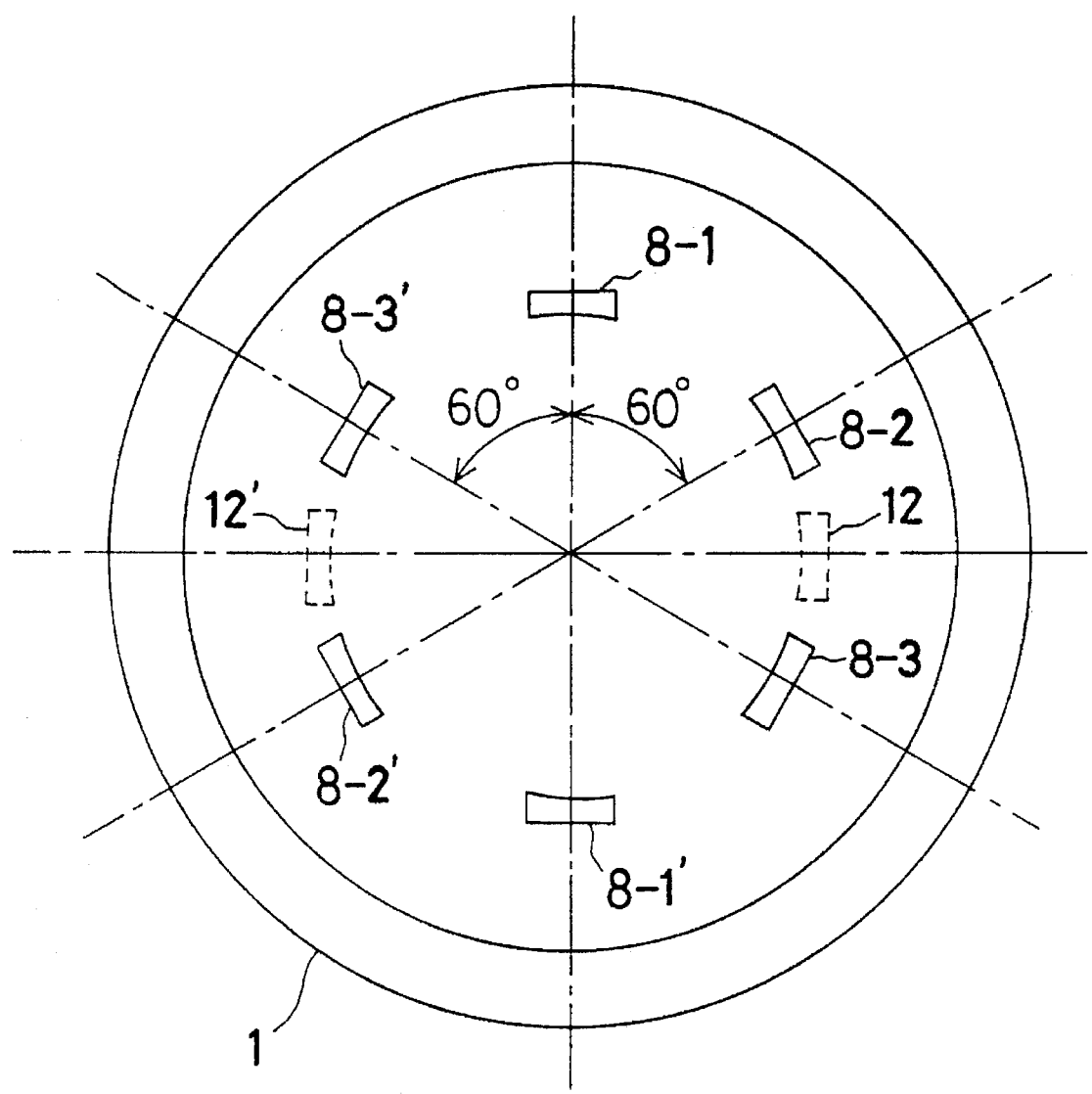
FIG. 2 shows an example of the planar arrangement of the laser strainmeter according to the present invention.

FIG. 1 shows the arrangement of one embodiment of the laser strainmeter according to the present invention. FIG. 2 shows an example of the planar arrangement of the laser strainmeter according to the present invention. In these figures, reference numeral 1 denotes a cylindrical container, 2 seals, 3 optical fibers, 4 and 9 collimators, 5 and 10 lenses, 6 and 11 rectangular prisms, 7 and 13 concave mirror holders, and 8 and 12 concave mirrors.

Referring to FIG. 1, the cylindrical container 1 is buried in the ground to measure small strain changes of the earth's crust as changes of bore diameters. The laser strainmeter 1 may be any corrosion-resistant and pressure-resistant container made, for example, of metal or ceramic material. The inside of the cylindrical container 1 is maintained under vacuum in order to avoid the influence of change of temperature of the medium. However, in a case where the cylindrical container 1 is buried in the ground, the temperature is stable. Therefore, the inside of the cylindrical container 1 may be kept being filled with an inert gas.

The laser strainmeter has a plurality of sensor resonators, and a reference resonator. The reference resonator is installed in the vicinity of the sensor resonators. The reference resonator is a multiple reflection Fabry-Pérot to interferometer composed of a pair of concave mirrors which are held at a fixed distance by a concave mirror holder 13, together with a pair of collimators 9, a pair of lenses 10, and a pair of rectangular prisms 11, and in which laser light is made incident from an optical fiber 3 through a collimator 9. Each sensor resonator is a multiple reflection Fabry-Pérot interferometer which has a pair of concave mirrors 8 which are attached to the inner wall of the cylindrical container 1 by respective concave mirror holders 7 so that the mutual optical axis of the mirrors 8 lies in the diametrical direction of the cylindrical container 1, together with collimators 4, lenses 5, and rectangular prisms 6, and in which laser light is made incident from an optical fiber 3 through a collimator 4. The plurality of sensor resonators are placed so that the mutual optical axes of the pairs of concave mirrors 8 extend in different directions.

FIG. 2 shows an example of the arrangement of concave mirrors constituting each resonator. Pairs of concave mirrors 8-1 and 8-1', 8-2 and 8-2', and 8-3 and 8-3' are used to constitute three sensor resonators, and are attached to the inner wall of the cylindrical container 1 so that the optical axes thereof lie at 120° to each other. Thus, the sensor resonators are placed on the same plane. A pair of concave mirrors 12 and 12' are used to constitute a reference resonator. The concave mirrors 12 and 12' are disposed in gaps between concave mirrors of the sensor resonators, and held at a fixed distance. Thus, the concave mirrors 12 and 12' can also be placed on the same plane. In this case, it is necessary to devise special frames used to hold the concave mirrors 12 and 12' at a fixed distance from invading the resonance area of each resonator. Examples of such a scheme include using only upper and lower frames, providing bores in the frames at portions which correspond to the resonance areas of resonators, and so forth. It is possible to arrange the sensor resonators on the same plane and place the reference resonator on a different plane so that the sensor and reference resonators form two layers, as shown in FIG. 1. It is also possible to unitize each of the sensor and reference resonators and arrange each unit in different layers. If the reference and sensor resonators are disposed on the same plane, the height of the cylindrical container is minimized, resulting in a compact arrangement. If the reference and sensor resonators are disposed in different layers, the height of the cylindrical container increases. However, if unitized resonators are stacked, the assembly becomes easy.

For the paired concave mirrors 8 and 12, concave mirrors which have high reflectivity should be used, and the greatest care must be taken to dispose the concave mirrors so that the optical axes of each pair of concave mirrors coincide with each other. The concave mirrors 8 and the rectangular prisms 6 are firmly attached to the inner wall of the cylindrical container 1 by the concave mirror holders 7. In the reference resonator, the concave mirror holder 13 is formed by using a member which has a small coefficient of thermal expansion, and disposed so that deformation of the cylindrical container 1 will not affect the distance between the pair of concave mirrors 12.

In the laser strainmeter of this embodiment, light from laser oscillators, which are provided on the ground, is transmitted to the inside of the cylindrical container 1 by the optical fibers 3 through the seals 2. The light is passed through the collimators 4 and 9 to form bundles of parallel rays, which are then passed through the lenses 5 and 10 so as to focus on the respective centers of the resonators (cavities). Then, the light is reflected by the prisms 6 and 11 so as to enter the resonators from behind the concave mirrors 8 and 12. The light, which has been led into the resonators, resonates at a frequency corresponding to the distance between each pair of concave mirrors 8 and 12.

Figure 3:
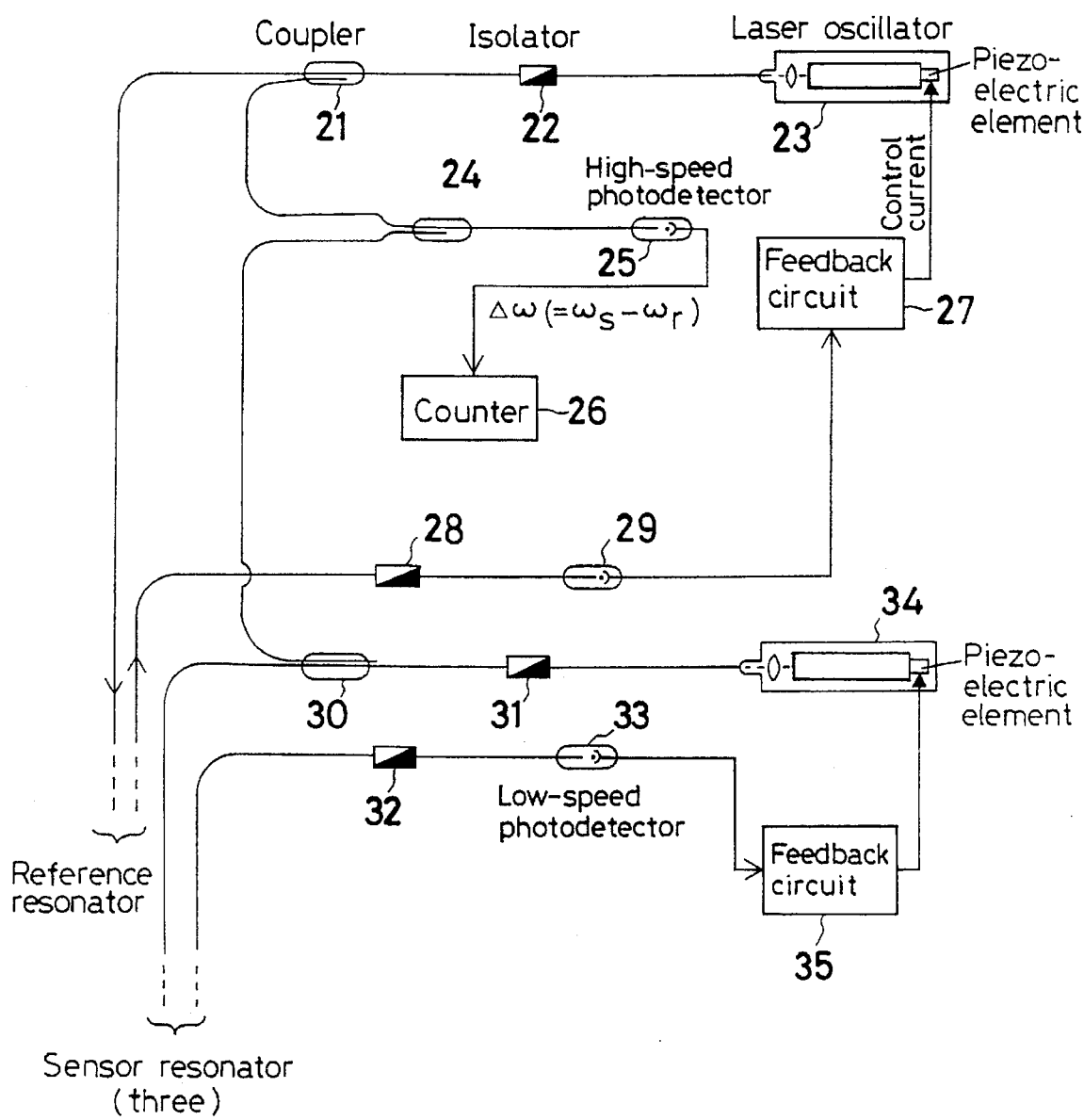
FIG. 3 shows an example of the arrangement of a ground-side signal processing system of the laser strainmeter.

FIG. 3 shows an example of the arrangement of a ground-side signal processing system of the laser strainmeter. In the figure, reference numerals 21, 24 and 30 denote couplers, 22, 28, 31 and 32 isolators, 23 and 34 laser oscillators, 25 a high-speed photodetector, 26 a counter, 27 and 35 feedback circuits, and 29 and 33 low-speed photodetectors.

As shown in FIG. 1, a pair of optical fibers 3 are led to each resonator, and optically connected to a pair of concave mirrors 8 or 12, respectively, which constitute the resonator. Laser light from an external laser oscillator 23 or 34, as shown in FIG. 3, is led to one of the pair of optical fibers 3, and light from the resonator is led to a feedback circuit 27 or 35 through the other optical fiber 3. Isolators 22 and 31 prevent the backward light from the resonators in the ground from re-entering the laser oscillators 23 and 34. Isolators 28 and 32 prevent the reflected light from low-speed photodetectors 29 and 33 from entering the underground resonators. The feedback circuits 27 and 35 control the distance between a pair of concave mirrors constituting each of the laser oscillators 23 and 34 by expanding or contracting a piezoelectric element of each of the laser oscillators 23 and 34 so that the resonance frequency of each of the laser oscillators 23 and 34 coincides with the resonance frequency of the associated resonator.

Laser light that is led into the resonators from the laser oscillators 23 and 34, which are controlled as described above, is taken into a coupler 24 for measurement through couplers 21 and 30. Thus, the light for the sensor resonators is taken into the coupler 24 through the coupler 30, and the light from the reference resonator is taken into the coupler 24 through the coupler 21. Then, the superposed lights are applied to a photodetector 25, and a difference in resonance frequency between each sensor resonator and the reference resonator is detected with a counter 26. Consequently, three resonance frequency differences are obtained. Strain changes are obtained by utilizing these resonance frequency differences as follows:

Assuming that the three resonance frequency differences are $\Delta\omega_1$, $\Delta\omega_2$, and $\Delta\omega_3$, $$\Delta\omega_1 = \omega_1 - \omega_{ref}$$

$$\Delta\omega_2 = \omega_2 - \omega_{ref}$$

$$\Delta\omega_3 = \omega_3 - \omega_{ref}$$

where $\omega_1$, $\omega_2$, $\omega_3$ and $\omega_{ref}$ are the resonance frequencies of the three sensor resonators and the reference resonator, respectively.

Considering that $\omega_1 \approx \omega_2 \approx \omega_3 \approx \omega_{ref}$, $$\Delta\omega_1/\omega_1 = \Delta\omega_1/\omega_{ref} = -\Delta d_1/d \rightarrow \Delta d_1 = -(\Delta\omega_1/\omega_{ref})d$$

where $\Delta d_1$ is the amount of extension of the diameter in the sensor direction, and $d$ is the diameter of the container.

Similarly, $$\Delta d_2 = -(\Delta\omega_2/\omega_{ref})d$$

$$\Delta d_3 = -(\Delta\omega_3/\omega_{ref})d$$

In this way, amounts of change of three diameters are obtained independently of each other. Accordingly, three components of strain change are obtained on the basis of the strain measuring theory based on bore diameter change, which has already been established.

It should be noted that the present invention is not necessarily limited to the above-described embodiment, and that various changes and modifications are possible. For example, although in the foregoing embodiment three sensor resonators are disposed so that the directions of the respective optical axes are 120° different from each other, the optical axes may be set at any angle to each other, and the number of sensor resonators may be 2 or 1 according to the purpose of observation. Further, a spherical container could be used in place of the cylindrical container. In this case, if independent sensor resonators for six directions are disposed inside the spherical container by installing each pair of concave mirrors so that the concave mirrors diametrically face each other, it is possible to measure deformations independently in the six directions of the spherical container buried in a continuous medium. Thus, it is possible to obtain six components of strain changes acting on a uniform medium from the diameter changes in the six directions. It should be noted that either a plane mirror or a convex mirror can be used in place of either one of the two concave mirrors provided in each of the sensor and reference resonators. Further, since changes of diameters of a container are accurately observed even in a higher-frequency region in which it has heretofore been impossible to observe a diameter change, the laser strainmeter of the present invention can also be utilized as a wide-band strain seismometer for detecting seismic waves in the form of strain. Further, the laser strainmeter may be disposed not only in the earth's crust but also in a liquid or a gas as a medium to use it as a pressure gauge. For example, the laser strainmeter of the present invention could be installed in the sea bottom to measure water pressure. In such a case, since the water has no directional property as the earth's crust, the laser strainmeter may be formed by using a single sensor resonator, or arranged so as to sample data measured by only one of a plurality of sensor resonators.

As will be clear from the foregoing description, according to the present invention, deformation of a cylindrical or spherical container disposed in a medium, e.g., the earth's crust, caused by strain changes of the medium is detected in the form of changes of resonance frequency caused by changes of the distance between a pair of concave mirrors of a sensor resonator which are attached to the inner wall of the cylindrical or spherical container, and a difference in resonance frequency between the sensor resonator and a reference resonator, in which the distance between concave mirrors is fixed, is read with a counter. Accordingly, the observed frequency differences are converted into a change of diameters of the cylindrical or spherical container with respect to the optical axis direction of the concave mirrors of the sensor resonator.

Moreover, since the interior of the container is formed from an optical system and includes no electrical device, the laser strainmeter can cope with high-temperature conditions, and it is possible to obtain stable strain measurement data by maintaining the inside of the cylindrical or spherical container under a vacuum or in a state of being filled with an inert gas according to the environmental conditions of a medium in which the container is buried.

In addition, since the laser strainmeter of the present invention is capable of accurately observing a diameter change of the container even in a high-frequency region in which it has heretofore been impossible to observe a diameter change, the laser strainmeter of the present invention may also be utilized as a wide-band strain seismometer for detecting a seismic wave in the form of strain.

What I claim is:

1. A laser strainmeter for observing small strain changes of a medium by measuring changes of diameters of a container disposed in the medium, said laser strainmeter comprising:

a plurality of sensor resonators, each resonator comprising a multiple reflection interferometer having a pair of concave mirrors which are attached to an inner wall of said container to face each other in a diametrical direction of said container so that optical axes of said sensor resonators extend in different directions;

a reference resonator comprising a multiple reflection interferometer having a pair of concave mirrors which are disposed in the vicinity of said sensor resonators, and which are held at a fixed distance from each other; and laser oscillators which are connected to said sensor and reference resonators through optical fibers, respectively, so that laser light beams having the same resonance frequencies as those of the associated resonators are transmitted from said laser oscillators to said resonators through said optical fibers;

wherein change in distance between the pair of concave mirrors of each of said sensor resonators is obtained from difference in resonance frequency between each sensor resonator and said reference resonator, thereby obtaining a strain change of the medium in which said container is buried.

2. A laser strainmeter according to claim 1, wherein the optical axes of said sensor resonators intersect the optical axis of said reference resonator at different angles approximately at a center of said container.

3. A laser strainmeter according to claim 1, wherein said container is a cylindrical container, and wherein each of said sensor resonators and said reference resonator are disposed in layers.

4. A laser strainmeter according to claim 1, further comprising a feedback circuit provided for each of said laser oscillators, so that the resonance frequency of each laser oscillator is made coincident with the resonance frequency of the resonator connected to said laser oscillator.

5. A laser strainmeter according to claim 1, wherein an inside of said container is maintained under a vacuum or in a state of being filled with an inert gas.

6. A laser strainmeter according to claim 1, wherein said medium is earth crust.

* * * * *